US010846067B2

(12) United States Patent
Imazawa

(10) Patent No.: US 10,846,067 B2
(45) Date of Patent: Nov. 24, 2020

(54) SOFTWARE GENERATION METHOD AND SOFTWARE GENERATION SYSTEM

(71) Applicant: HITACHI, LTD., Tokyo (JP)

(72) Inventor: Kei Imazawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/451,042

(22) Filed: Jun. 25, 2019

(65) Prior Publication Data
US 2020/0073641 A1 Mar. 5, 2020

(30) Foreign Application Priority Data

Aug. 30, 2018 (JP) .................................. 2018-161325

(51) Int. Cl.
*G06F 9/46* (2006.01)
*B23Q 35/00* (2006.01)
(Continued)

(52) U.S. Cl.
CPC ............... *G06F 8/35* (2013.01); *G06N 7/005* (2013.01); *B23Q 35/12* (2013.01); *G06Q 10/06* (2013.01)

(58) Field of Classification Search
CPC ......... G06N 7/005; G06F 8/35; G06F 11/008; G06Q 10/06; G06Q 30/0202; G06Q 10/10
See application file for complete search history.

(56) References Cited

U.S. PATENT DOCUMENTS 7,672,921 B1 * 3/2010 Clay ...................... G06Q 10/06
706/45
8,290,499 B2 * 10/2012 Rappaport ........... H04B 17/309
455/446
(Continued)

FOREIGN PATENT DOCUMENTS

JP 2011-076391 A 4/2011

OTHER PUBLICATIONS

Wayne J. Oates et al., Simulation of a Network Manufacturing Process, 1981, [Retrieved on Sep. 24, 2020]. Retrieved from the internet: <URL: https://dl.acm.org/doi/pdf/10.5555/800080.802632> 6 Pages (551-556) (Year: 1981).*
(Continued)

*Primary Examiner* — Anibal Rivera
(74) *Attorney, Agent, or Firm* — Mattingly & Malur, PC

(57) ABSTRACT

The software generation method uses a computer, wherein the computer includes a control unit and a storage unit; the storage unit stores manufacturing log data that includes sensor data acquired in one or both of a manufacturing process and an inspection process, and environmental configuration information that relates to a manufacturing device or an inspection device from which the sensor data are acquired for each component or product; and the control unit reads the manufacturing log data from the storage unit, reads the environment configuration information from the storage unit, constructs a causal inference model based on the manufacturing log data, constructs an expanded causal inference model by expanding the causal inference model using the environment configuration information, generates a contracted model by contracting the expanded causal inference model to a causal relation of prescribed target data of interest, and generates prescribed application software by reading the contracted model.

5 Claims, 19 Drawing Sheets

(51) Int. Cl.
*G05B 15/02* (2006.01)
*G06F 8/35* (2018.01)
*G06N 7/00* (2006.01)
*B23Q 35/12* (2006.01)
*G06Q 10/06* (2012.01)

(56) References Cited

U.S. PATENT DOCUMENTS

| | | | | |
|---|---|---|---|---|
| 8,489,530 | B2* | 7/2013 | De | G06N 7/005 706/45 |
| 8,571,904 | B2* | 10/2013 | Guru | G06Q 10/06 705/7.11 |
| 2002/0078403 | A1* | 6/2002 | Gullo | G06F 11/008 714/37 |
| 2003/0150908 | A1* | 8/2003 | Pokorny | G05B 13/0285 235/375 |
| 2003/0150909 | A1* | 8/2003 | Markham | B23Q 35/12 235/376 |
| 2003/0154144 | A1* | 8/2003 | Pokorny | G06Q 10/10 705/28 |
| 2003/0155415 | A1* | 8/2003 | Markham | G06Q 50/00 235/376 |
| 2003/0158795 | A1* | 8/2003 | Markham | G05B 19/41875 705/28 |
| 2005/0187744 | A1* | 8/2005 | Morrison | G06Q 10/06 703/2 |
| 2009/0150325 | A1* | 6/2009 | De | G06N 7/005 706/52 |
| 2009/0204232 | A1* | 8/2009 | Guru | G06Q 10/06 700/9 |
| 2010/0082143 | A1* | 4/2010 | Pantaleano | G06Q 10/06 700/105 |
| 2011/0126206 | A1* | 5/2011 | Kato | G06F 9/505 718/103 |
| 2013/0216141 | A1* | 8/2013 | Ushiba | G06K 9/3241 382/218 |
| 2016/0012230 | A1* | 1/2016 | Hanai | G06F 21/57 726/6 |
| 2016/0101785 | A1* | 4/2016 | Takahashi | G06K 9/00791 701/31.4 |
| 2016/0253618 | A1* | 9/2016 | Imazawa | G06Q 10/06395 705/7.15 |
| 2016/0314571 | A1* | 10/2016 | Finn | G06F 16/40 |
| 2018/0260827 | A1* | 9/2018 | Sullivan | G06Q 30/0202 |
| 2018/0268015 | A1* | 9/2018 | Sugaberry | G06N 5/003 |
| 2019/0251575 | A1* | 8/2019 | Berti | G06F 16/27 |
| 2019/0354922 | A1* | 11/2019 | Berti | G06K 7/1417 |

OTHER PUBLICATIONS

Lavindra de Silva et al., Sysnthesisin Industry—Standard Manufacturing Process Controllers, May 8-12, 2017, [Retrieved on Sep. 24, 2020]. Retrieved from the internet: <URL: https://dl.acm.org/doi/pdf/10.5555/3091125.3091448> 3 Pages (1811-1813) (Year: 2017).*

* cited by examiner

[FIG. 1]
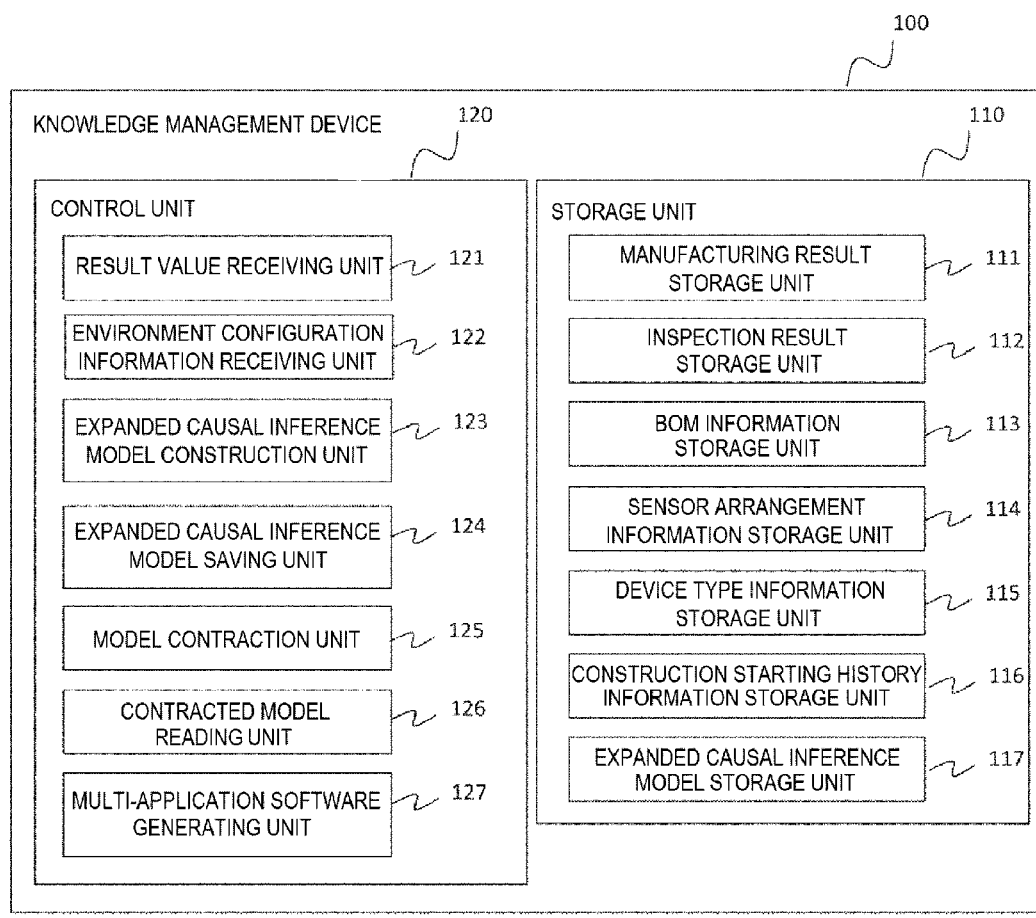

[FIG. 2]
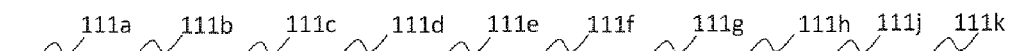

[FIG. 3]
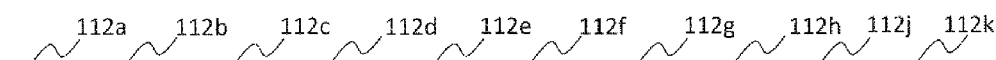

[FIG. 4]
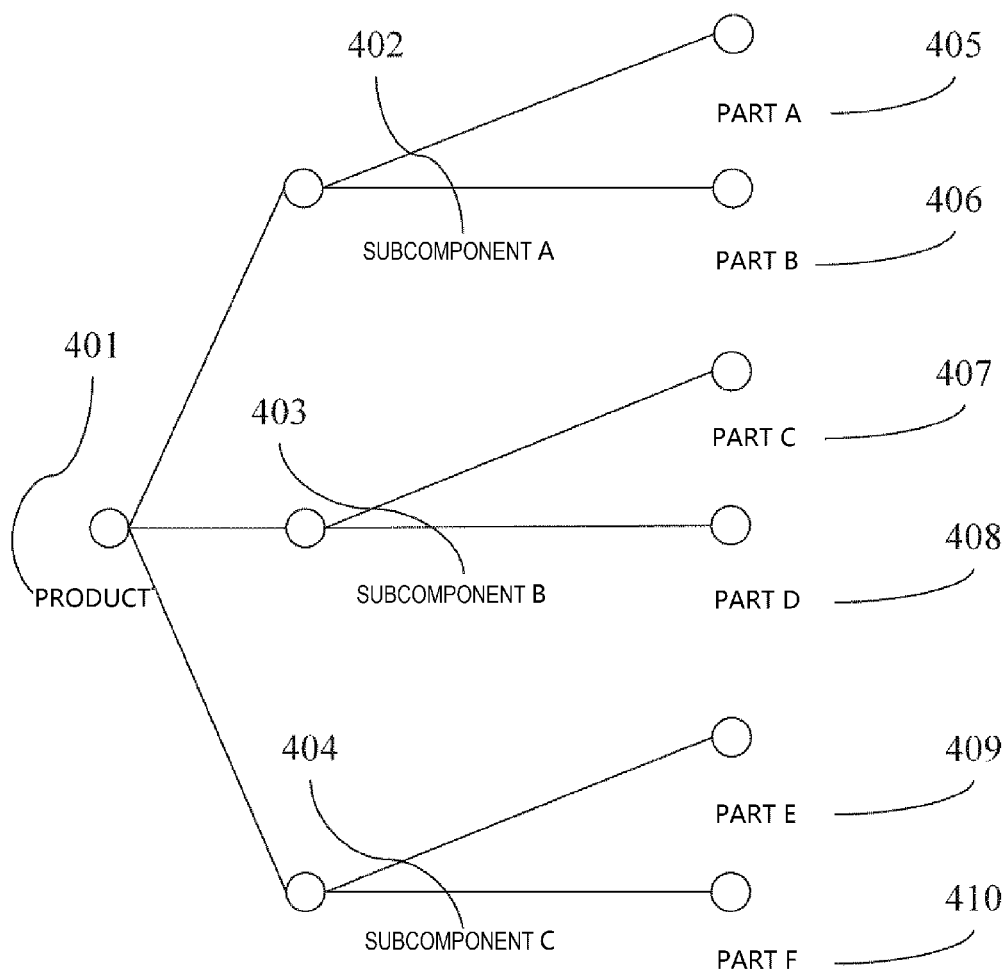

[FIG. 5]

|  | PRODUCT | SUBCOMPONENT A | SUBCOMPONENT B | SUBCOMPONENT C | PART A | PART B | PART C | PART D | PART E | PART F |
|---|---|---|---|---|---|---|---|---|---|---|
| PRODUCT |  | 1 | 1 | 1 |  |  |  |  |  |  |
| SUBCOMPONENT A |  |  |  |  | 1 | 1 |  |  |  |  |
| SUBCOMPONENT B |  |  |  |  |  |  | 1 | 1 |  |  |
| SUBCOMPONENT C |  |  |  |  |  |  |  |  | 1 | 1 |
| PART A |  |  |  |  |  |  |  |  |  |  |
| PART B |  |  |  |  |  |  |  |  |  |  |
| PART C |  |  |  |  |  |  |  |  |  |  |
| PART D |  |  |  |  |  |  |  |  |  |  |
| PART E |  |  |  |  |  |  |  |  |  |  |
| PART F |  |  |  |  |  |  |  |  |  |  |

Columns labeled: 113A (PRODUCT), 113B (SUBCOMPONENT A), 113C (SUBCOMPONENT B), 113D (SUBCOMPONENT C), 113E (PART A), 113F (PART B), 113G (PART C), 113H (PART D), 113J (PART E), 113K (PART F)

[FIG. 6]
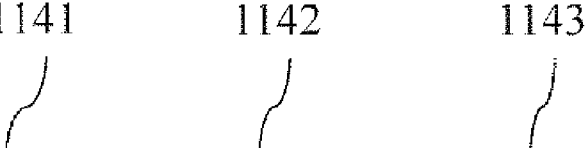

[FIG. 7]
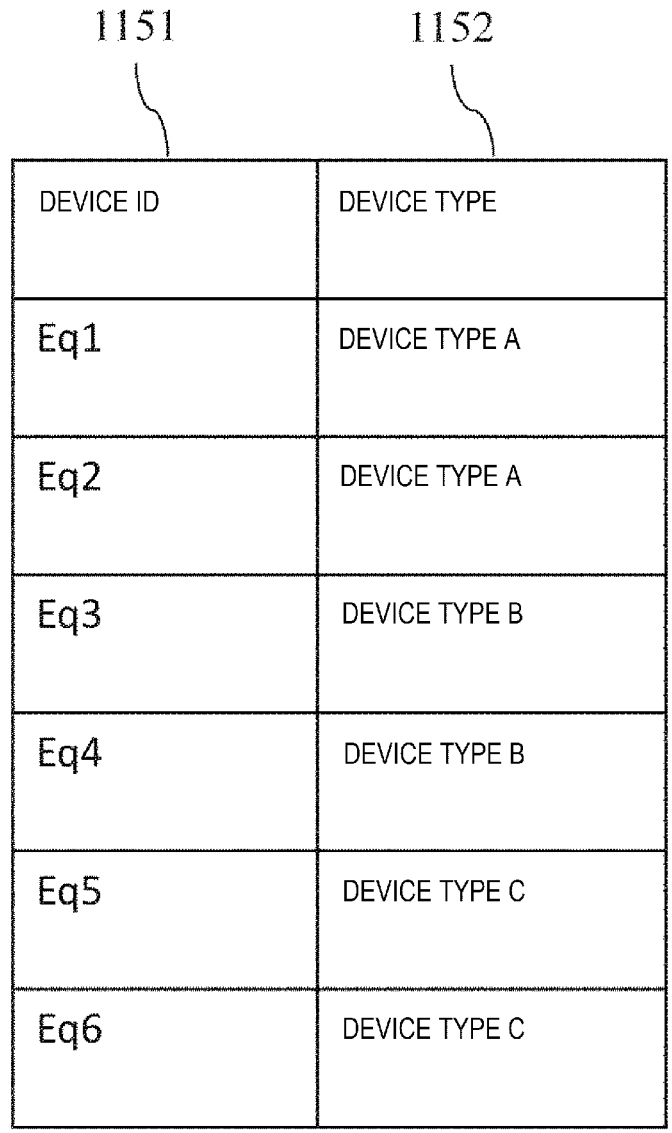

[FIG. 8]
|  | A01 | A02 | A03 | A04 | A05 |
|---|---|---|---|---|---|
| PROCESS 1 | Eq1 | Eq2 | Eq1 | Eq2 | Eq1 |
| PROCESS 2 | Eq3 | Eq3 | Eq4 | Eq4 | Eq4 |
| PROCESS 3 | Eq6 | E5 | Eq5 | Eq6 | Eq5 |
1161, 1162, 1163, 1164, 1165
1166, 1167, 1168
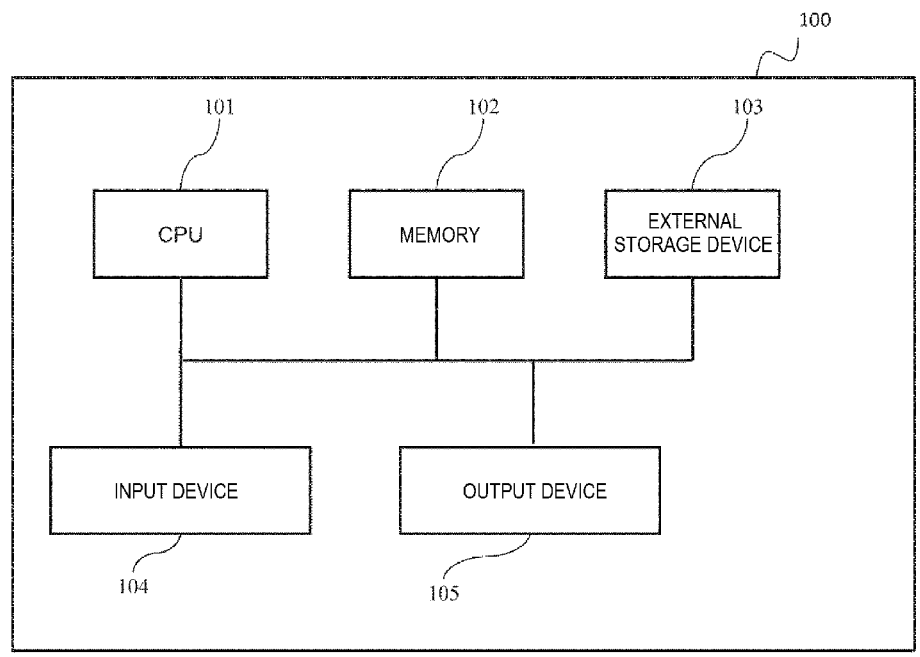
[FIG. 9]

[FIG. 10]
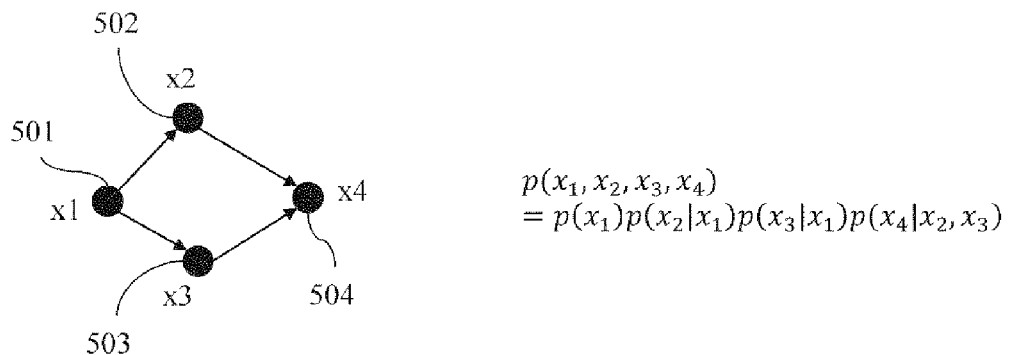
$$p(x_1, x_2, x_3, x_4) = p(x_1)p(x_2|x_1)p(x_3|x_1)p(x_4|x_2, x_3)$$
[FIG. 11]
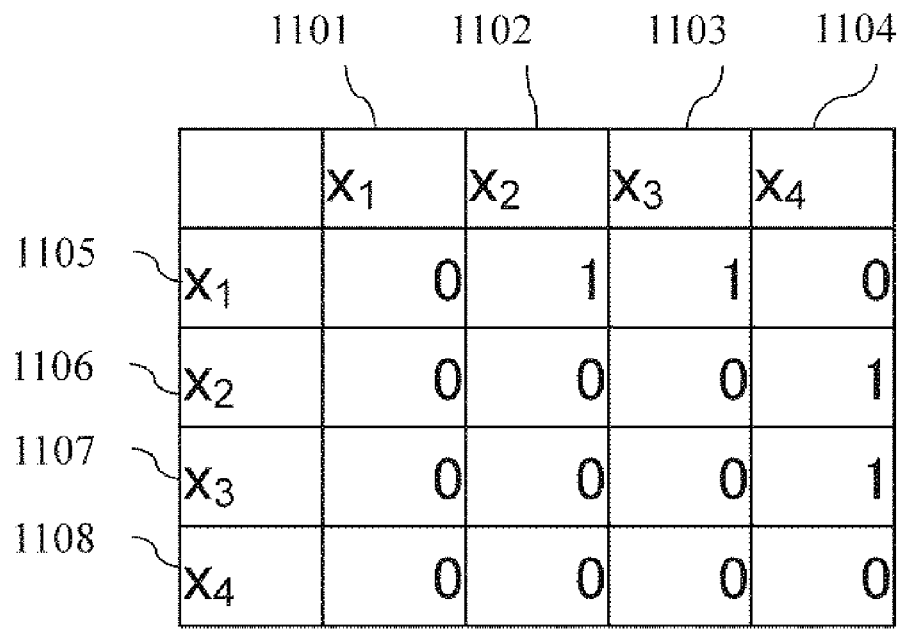

[FIG. 12]

|  | $x_2=1$ | $x_2=2$ | $x_2=3$ | $x_2=4$ | $x_2=5$ |
|---|---|---|---|---|---|
| $x_1=1$ | 0.32 | 0.1 | 0.25 | 0.09 | 0.24 |
| $x_1=2$ | 0.26 | 0.23 | 0.03 | 0.24 | 0.24 |
| $x_1=3$ | 0.23 | 0.05 | 0.37 | 0.29 | 0.06 |
| $x_1=4$ | 0.17 | 0.28 | 0.24 | 0.11 | 0.2 |
| $x_1=5$ | 0.28 | 0.27 | 0.16 | 0.29 | 0 |

Column labels: 1201, 1202, 1203, 1204, 1205
Row labels: 1206, 1207, 1208, 1209, 1210

[FIG. 13]

| | $x_4=1$ | $x_4=2$ | $x_4=3$ | $x_4=4$ | $x_4=5$ |
|---|---|---|---|---|---|
| $x_2=1, x_3=1$ | 0.11 | 0.18 | 0.34 | 0.32 | 0.05 |
| $x_2=1, x_3=2$ | 0.27 | 0.23 | 0.08 | 0.11 | 0.31 |
| $x_2=1, x_3=3$ | 0.13 | 0.15 | 0.24 | 0.26 | 0.21 |
| $x_2=2, x_3=1$ | 0.41 | 0.32 | 0.04 | 0.08 | 0.15 |
| $x_2=2, x_3=2$ | 0.45 | 0.07 | 0.05 | 0.31 | 0.12 |
| $x_2=2, x_3=3$ | 0.29 | 0.1 | 0.16 | 0.11 | 0.34 |
| $x_2=3, x_3=1$ | 0.06 | 0.08 | 0.15 | 0.31 | 0.4 |
| $x_2=3, x_3=2$ | 0.02 | 0.33 | 0.31 | 0.23 | 0.1 |
| $x_2=3, x_3=3$ | 0.15 | 0.2 | 0.31 | 0.29 | 0.05 |
| $x_2=4, x_3=1$ | 0.28 | 0.15 | 0.29 | 0.05 | 0.23 |
| $x_2=4, x_3=2$ | 0.31 | 0.26 | 0.14 | 0.09 | 0.21 |
| $x_2=4, x_3=3$ | 0.14 | 0.01 | 0.46 | 0.07 | 0.32 |
| $x_2=5, x_3=1$ | 0.28 | 0.38 | 0.14 | 0.1 | 0.11 |
| $x_2=5, x_3=2$ | 0.23 | 0.15 | 0.26 | 0.29 | 0.07 |
| $x_2=5, x_3=3$ | 0.14 | 0.29 | 0.06 | 0.14 | 0.38 |

[FIG. 14]
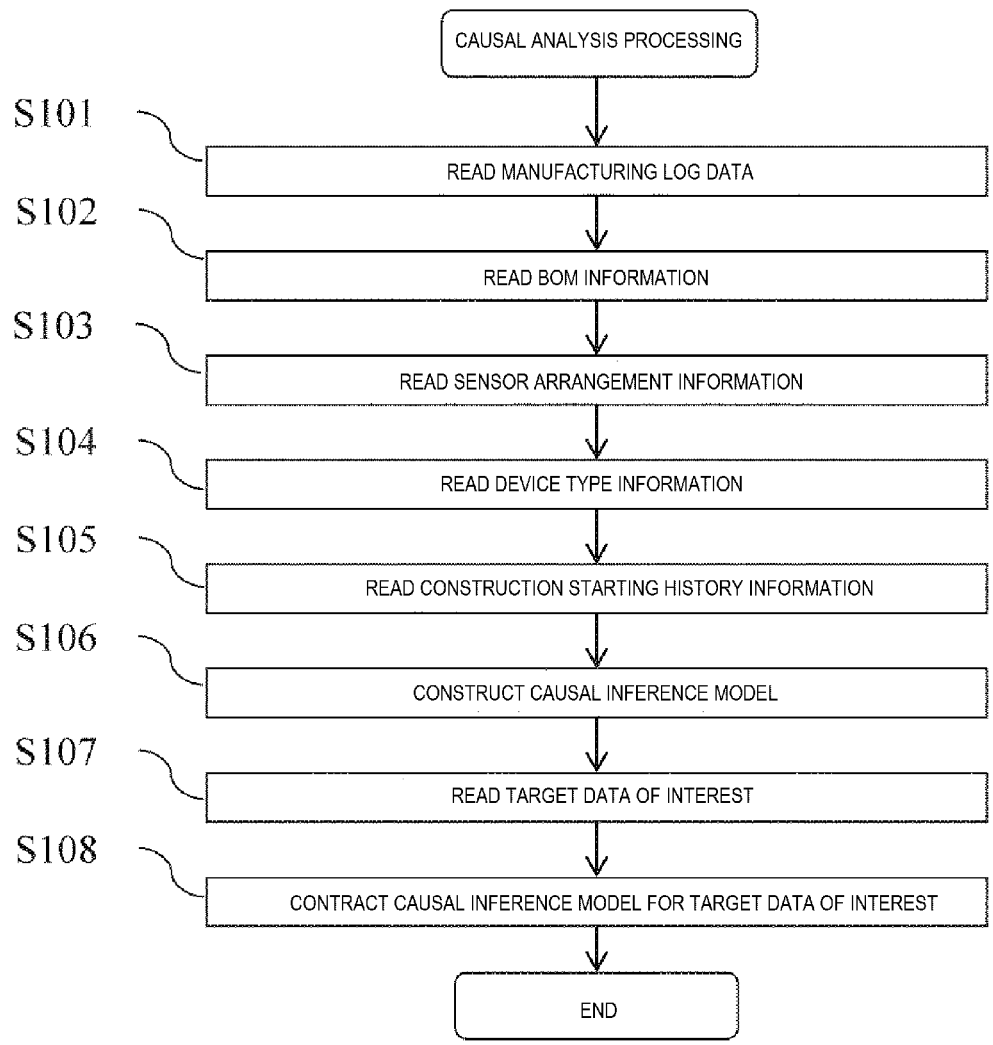

[FIG. 15]
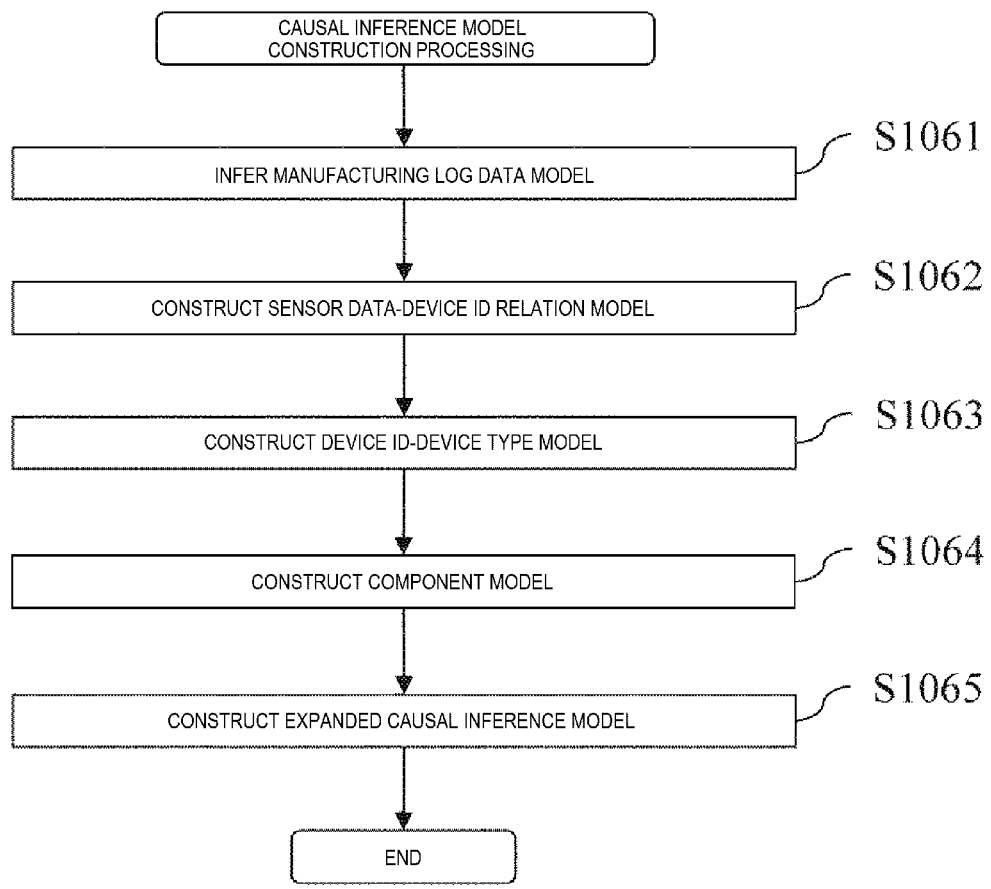

[FIG. 16]
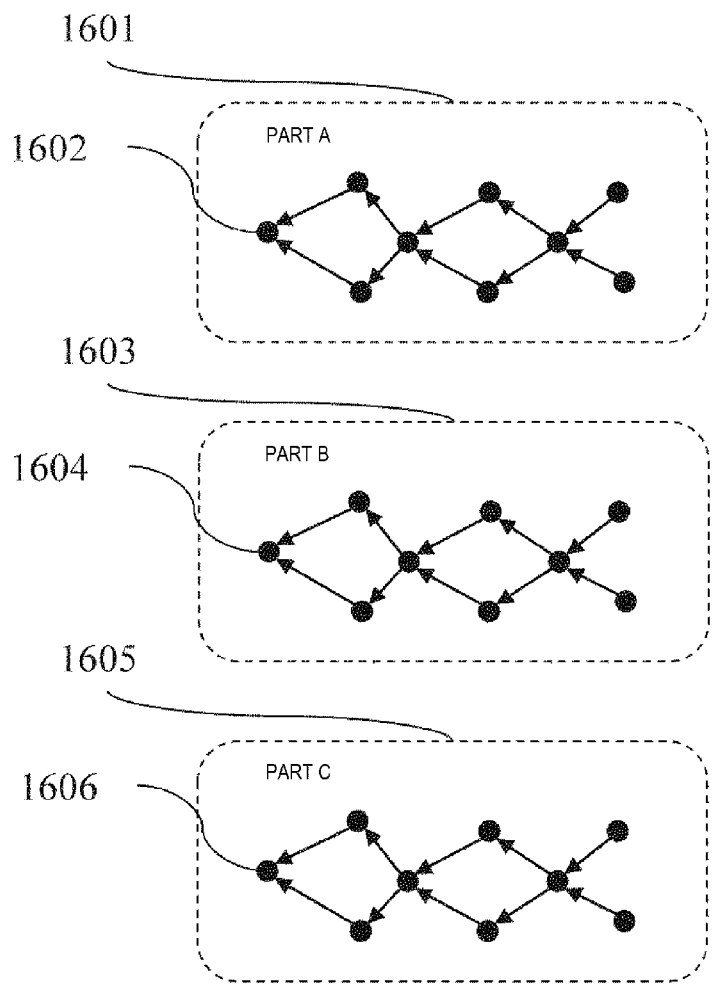
[FIG. 17]
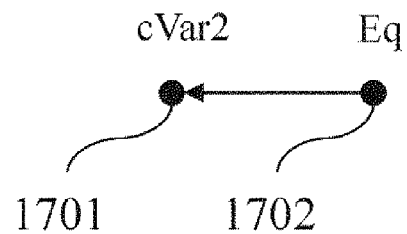

[FIG. 18]
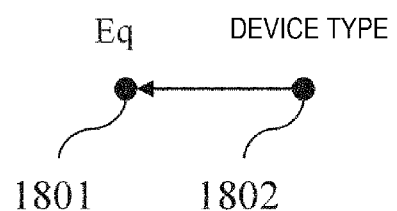
[FIG. 19]
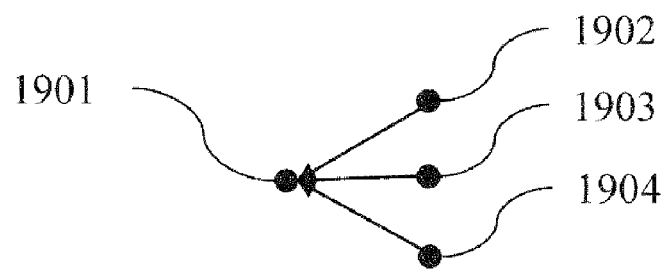

[FIG. 20]
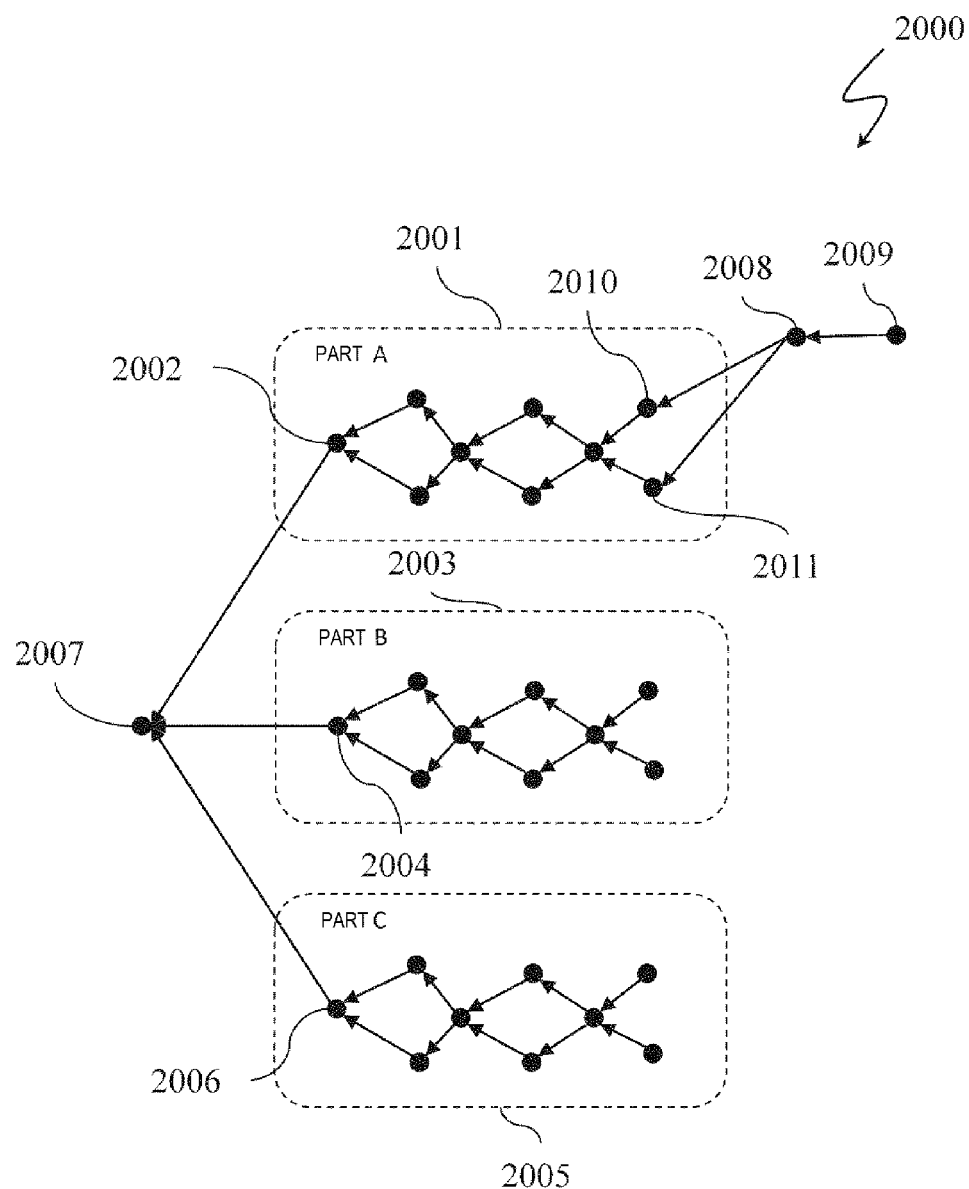

[FIG. 21]
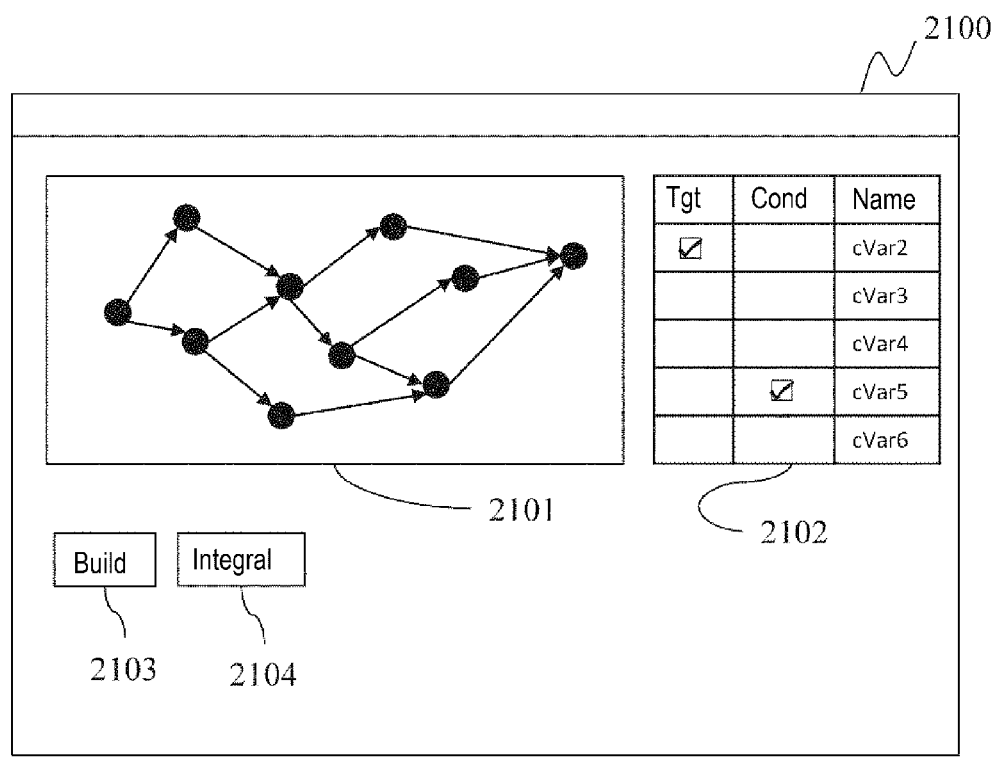

[FIG. 22]
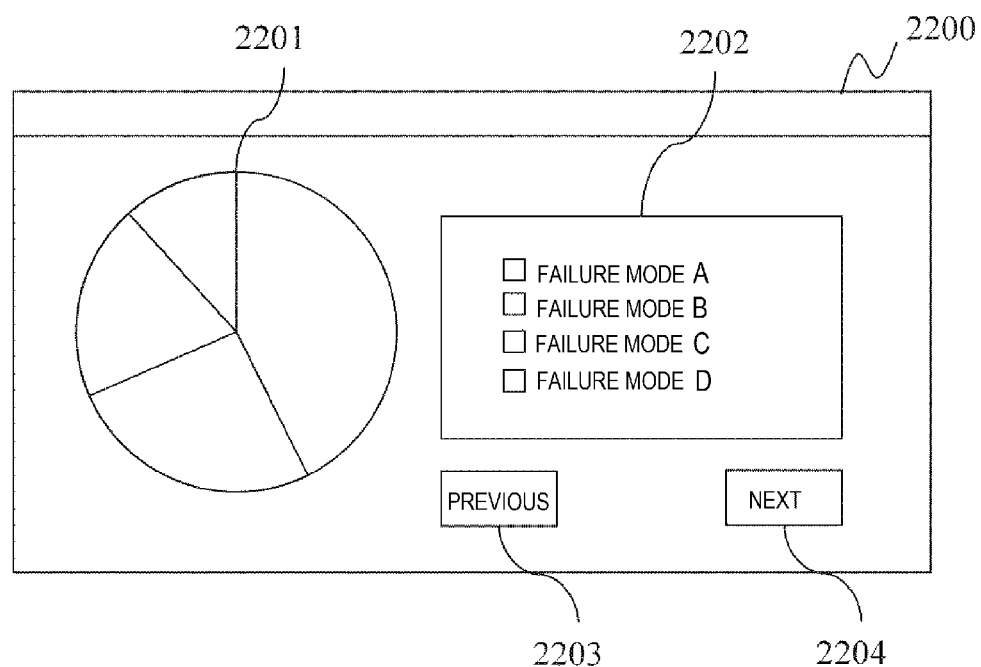

[FIG. 23]
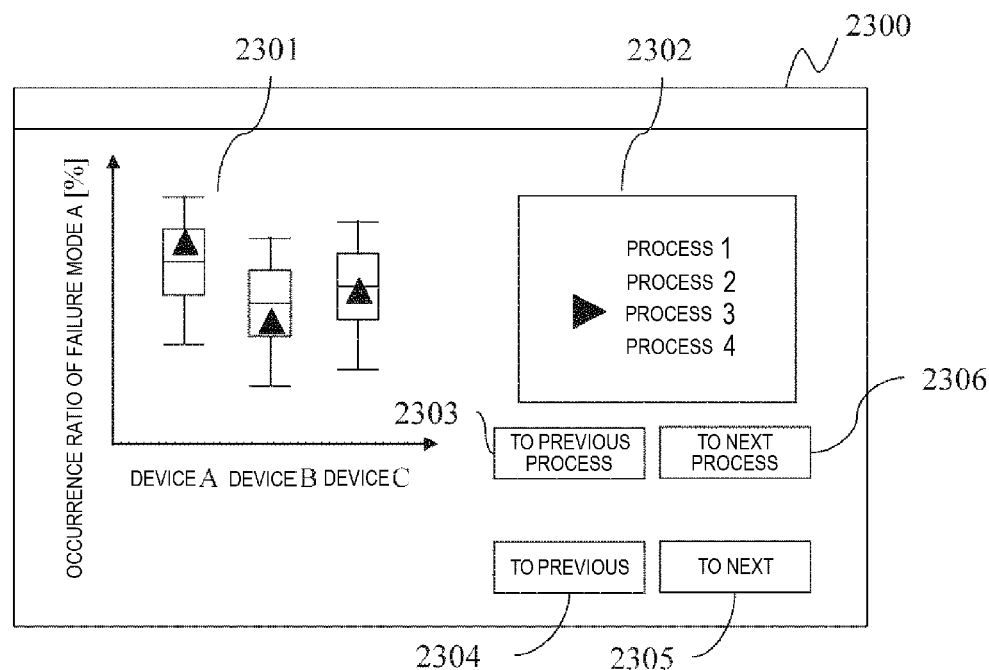
[FIG. 24]
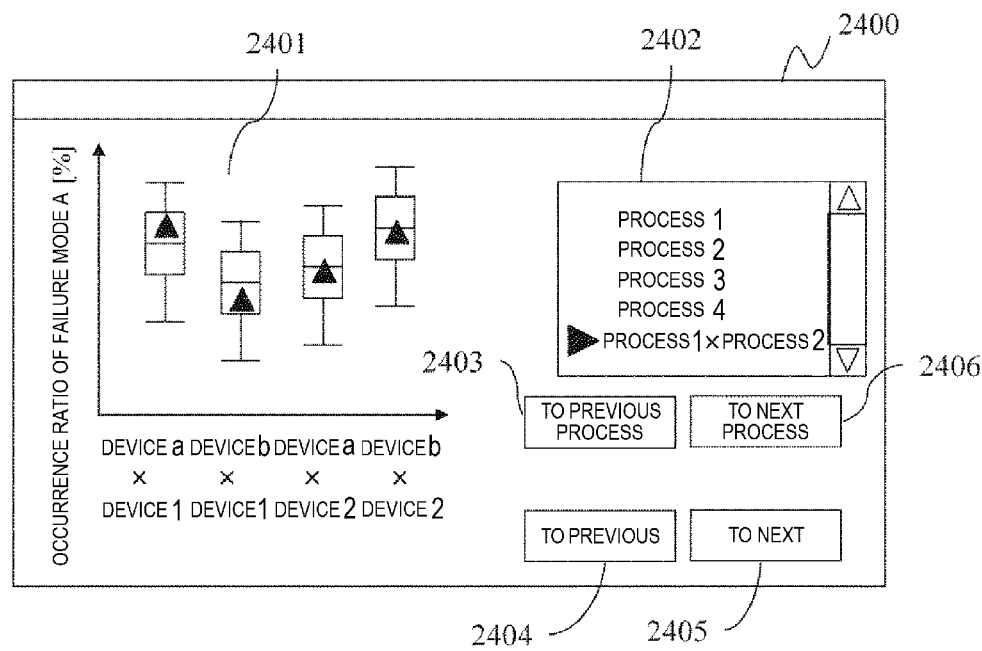

SOFTWARE GENERATION METHOD AND SOFTWARE GENERATION SYSTEM

CROSS-REFERENCE TO RELATED APPLICATION

The present application claims priority from Japanese application JP 2018-161325, filed on Aug. 30, 2018, the contents of which is hereby incorporated by reference into this application.

TECHNICAL FIELD

The present invention relates to a software generation method and a software generation system.

BACKGROUND ART

JP-A-2011-076391 (PTL 1) relates to a background technique of this technical field. PTL 1 discloses that "a data selection unit compares in advance a maximum value of probability having a maximum probability of an output variable when an arbitrary value is set to each input variable corresponding to the selection target data out of an unspecified large number of selection target data included in a Bayesian network model pre-stored in a model data storage unit with a threshold held in a threshold temporary holding unit; when the maximum value of the probability is equal to or larger than the threshold, a combination of the input variable and an arbitrary value corresponding to the maximum value of the probability is registered in an input variable white list; and when performing probability calculation of an output variable with the Bayesian network, a probability calculation unit is caused to perform probability calculation by using only the selection target data whose combination of the input variable and the arbitrary value corresponding to the maximum value of probability is held in the input variable white list as a probability calculation target".

PRIOR ART LITERATURE

Patent Literature

PTL 1: JP-A-2011-076391

SUMMARY OF INVENTION

Technical Problem

PTL 1 describes a method for performing probability calculation by using a Bayesian network for the purpose of failure diagnosis. However, when the method is applied to a manufacturing line, there is no effect even if applied as it is since an improvement corresponding to a diagnosis result is required after performing a failure diagnosis or a failure factor diagnosis.

An object of the invention is to automatically generate various types of application software according to a diagnosis result at a manufacturing site.

Solution to Problem

The present application includes a plurality of means that solves at least apart of the above problems, and an example thereof is as follows. In order to solve the above problems, the invention provides a software generation method for generating software by using a computer according to one aspect of the invention, wherein the computer includes a control unit and a storage unit; the storage unit stores manufacturing log data that includes sensor data acquired in one or both of a manufacturing process and an inspection process and environmental configuration information relating to a manufacturing device or an inspection device from which the sensor data are acquired for each part or product; and the control unit performs a result value receiving step of reading the manufacturing log data from the storage unit, an environment configuration information reading step of reading the environment configuration information from the storage unit, an expanded causal inference model construction step of constructing a causal inference model based on the manufacturing log data and constructing an expanded causal inference model by expanding the causal inference model by using the environment configuration information, a model contraction step of generating a contracted model by contracting the expanded causal inference model to a causal relation of prescribed target data of interest, and a software generation step of reading the contracted model and generating prescribed application software.

Advantageous Effect

According to the invention, various types of application software can be automatically generated according to the diagnosis result at the manufacturing site. Problems, configurations, and effects other than those described above will be clarified from following descriptions of embodiments.

BRIEF DESCRIPTION OF DRAWINGS

FIG. 1 is a diagram showing a configuration example of a knowledge management device according to a first embodiment of the invention.

FIG. 2 is a diagram showing a data structure example of a manufacturing result storage unit.

FIG. 3 is a diagram showing a data structure example of an inspection result storage unit.

FIG. 4 is a diagram showing a structure example of bill of materials (BOM) information.

FIG. 5 is a diagram showing a data structure example of a BOM information storage unit.

FIG. 6 is a diagram showing a data structure example of a sensor arrangement information storage unit.

FIG. 7 is a diagram showing a data structure example of a device type information storage unit.

FIG. 8 is a diagram showing a data structure example of a construction starting history information storage unit.

FIG. 9 is a diagram showing a hardware structure example of a knowledge management device.

FIG. 10 is a diagram showing examples of a causal inference model and a probability structural equation.

FIG. 11 is a diagram showing examples of a save format of the causal inference model.

FIG. 12 is a diagram showing examples of a save format of a conditional probability $p(x2|x1)$.

FIG. 13 is a diagram showing examples of a save format of a conditional probability $p(x4|x2, x3)$.

FIG. 14 is a diagram showing an example of a flow of a causal analysis processing.

FIG. 15 is a diagram showing an example of a flow of a causal inference model construction processing.

FIG. 16 is a diagram showing an example of a causal inference model of a terminal part.

FIG. 17 is a diagram showing a causal inference model of sensor data conditioned by a device ID.

FIG. 18 is a diagram showing a causal inference model of the device ID conditioned by a device type.

FIG. 19 is a diagram showing an example of a causal inference model of inspection data.

FIG. 20 is a diagram showing an example of an expanded causal inference model.

FIG. 21 is a diagram showing an example of a causal inference model construction screen.

FIG. 22 is a diagram showing an example of a failure mode selection screen of a machine difference analysis application.

FIG. 23 is a diagram showing an example of a box-whisker plot display screen for each process.

FIG. 24 is a diagram showing an example of a box-whisker plot display screen for a plurality of processes.

DESCRIPTION OF EMBODIMENTS

Hereinafter, an embodiment of the invention will be described below with reference to the drawings. The same members are generally denoted by the same reference symbols throughout all the drawings for describing the embodiment, and the repetitive description thereof will be omitted. Further, it is obvious that, in the following embodiment, the constituent elements (including element steps and the like) are not necessarily indispensable, unless otherwise stated or unless clearly considered to be essential in principle. Further, it is also obvious that expressions "composed of A", "made up of A", "having A", and "including A" do not exclude elements other than the element A, unless otherwise stated that only the element A is included. Similarly, in the following embodiment, when the shape of the constituent elements, positional relation thereof, and the like are described, the substantially approximate and similar shapes and the like are included therein unless otherwise stated or except the case where it is conceivable that they are apparently excluded in principle.

For example, when a factor that can be removed by improvement of a jig and the like is extracted as a diagnosis result, a fundamental countermeasure by device remodeling is required at the manufacturing site. Further, when a non-removable factor, such as aged degradation of a device or manufacturing variation due to device capability, is extracted, improvement by device control or device abnormality detection is required depending on whether the factor is constantly generated or non-constantly generated. Therefore, it is desirable that a countermeasure for remodeling the manufacturing line can be performed after diagnosis in an information system that assists the manufacturing site.

Further, it is not possible to handle a physical model described by functional relation with the probability calculation alone. Thus, generation of various types of application (application operation) software is realized by estimating a generic probability model using manufacturing data and knowledge known at the manufacturing site as inputs and extracting (contracting) necessary information from the probability model in an information processing system according to the invention.

Various methods of controlling a desired result in a manufacturing process or an inspection process are being researched by utilizing a correlation relation between various measured values that are analyzed by using the information processing system. For example, it is possible to analyze a correlation relation between rough variables (acquisition values of sensors and the like) according to big data analysis.

If a causal relation can be efficiently extracted from correlation relations between multiple measurement items, it is easy to specify a quantitative causal relation. Further, it is considered that the efficiency of application to other events can be increased by storing such a causal relation as knowledge.

When this is applied to the manufacturing process and the inspection process, it can be used to generate application software (for example, machine difference analysis, failure analysis, abnormality detection, device startup efficiency, and device control) that specifies a causal relation according to an event by constructing a causal inference model that includes measurement items by all associated sensors, creating a high dimensionality and high versatility expanded causal inference model by integrating the causal inference model by using environment configuration information that includes a facility or a process relating to the measurement, and a configuration of a product to be manufactured, and contracting (reducing) the expanded causal inference model to a simple probability model by specifying a focused causal relation according to an event to be applied.

FIG. 1 is a diagram showing a structure example of a knowledge management device according to a first embodiment of the invention. A knowledge management device 100 includes a storage unit 110 and a control unit 120. The storage unit 110 includes a manufacturing result storage unit 111, an inspection result storage unit 112, a bill of materials (BOM) information storage unit 113, a sensor arrangement information storage unit 114, a device type information storage unit 115, a construction starting history information storage unit 116, and an expanded causal inference model storage unit 117. That is, the manufacturing result storage unit 111 and the inspection result storage unit 112 are measurement items acquired by a sensor. The BOM information storage unit 113, the sensor arrangement information storage unit 114, the device type information storage unit 115, and the construction starting history information storage unit 116 correspond to information that specifies an environment configuration including a sensor facility, a process, a configuration of a product to be manufactured, and the like, that is, environment configuration information.

The control unit 120 includes a result value receiving unit 121, an environment configuration information receiving unit 122, an expanded causal inference model construction unit 123, an expanded causal inference model saving unit 124, a model contraction unit 125, a contracted model reading unit 126 and a multi-application software generating unit 127.

FIG. 2 is a diagram showing a data structure example of the manufacturing result storage unit. The manufacturing result storage unit 111 includes pVar1 (111*a*), pVar2 (111*b*), pVar3 (111*c*), pVar4 (111*d*), pVar5 (111*e*), pVar6 (111*f*), pVar7 (111*g*), pVar8 (111*h*), pVar9 (111*j*), and pVar10 (111*k*).

The manufacturing result storage unit 111 includes manufacturing data obtained by monitoring an operating state of a manufacturing device, and individual items of the manufacturing data are indicated by item names pVar1 to pVar10. For example, pVar1 (111*a*) is an item name that indicates an ID number for identifying an individual product. The pVar2 (111*b*) to pVar10 (111*k*) at second and subsequent columns are data obtained as results of monitoring the operating state of the manufacturing device with a sensor and the like. Examples of items of the operating state to be monitored include temperature, humidity, pressure, current, voltage, amount of substance, and the like during processing.

In general, these data are obtained by periodic sampling at the time of manufacturing the product. Here, the periodic sampling refers to periodically acquiring sensor data at a prescribed frequency according to various monitored items, such as a frequency of 100 times per second.

In general, the manufacturing and processing time of the product is longer than a sampling interval of the periodic sampling. Therefore, while one product is being processed, data acquired from the same sensor is acquired for a plurality of times. Therefore, when ID numbers for identifying individual products are arranged in a first column as shown in FIG. 2, data with the same ID number are duplicated since sampling data are obtained for a plurality of times.

Therefore, the ID numbers for identifying individual products are handled as unique keys for uniquely specifying each row vector, and data are formatted such that duplication does not occur in the ID numbers for identifying individual products by using statistical values (average value, median value, and the like) of the data acquired a plurality of times for each item.

As another example of monitoring the operating state, there is a processing time required for processing the product. For such data, data at one point (processing time) can be obtained each time one product is processed. Therefore, since duplication does not occur in the ID numbers for identifying individual products, the data can be directly used without being subjected to a statistical processing.

FIG. 3 is a diagram showing a data structure example of the inspection result storage unit. The inspection result storage unit 112 includes cVar1 (112a), cVar2 (112b), cVar3 (112c), cVar4 (112d), cVar5 (112e), cVar6 (112f), cVar7 (112g), cVar8 (112h), cVar9 (112j), and cVar10 (112k).

The inspection result storage unit 112 includes inspection data which are measurement results of an inspection device, and individual items of the inspection data are indicated by item names cVar1 to cVar10. For example, cVar1 (112a) is an item name indicating the ID number for identifying an individual product. These data have a correspondence relation with pVar1 (111a) of the manufacturing result storage unit 111 and the same individual is indicated by the same value. Therefore, it is possible to acquire a correspondence relation between the manufacturing data obtained by monitoring the operating state of the manufacturing device and the inspection data by referring to these data.

The cVar2 (112b) to cVar10 (112k) at second and subsequent columns are data obtained as results of measurement by the inspection device with a sensor and the like. Examples of the inspection data include a measurement value relating to a physical size such as a size of a specific portion of a product, and a measurement value relating to an electrical characteristic.

Such inspection data are measured as numerical values. A standard is set in the inspection data, and it is determined that whether the date is within the standard. The above cVar10 (112k) are data representing determination results of whether the product are within the standard. In this example, if the product are within the standard, "OK" is stored, if not, "NG" is stored.

Determination results according to such a standard are performed for each measurement value, and there is a case where all the determination results for every measurement value are recorded and a case where a comprehensive determination result for all measurement values is recorded. However, in an example of FIG. 3, only one determination result is described, which means that the comprehensive determination result is described.

FIG. 4 is a diagram showing a configuration example of BOM information. The BOM information is typically configured by a tree structure. Product 401 represents a product that is subject to structure description in the BOM information. The product 401 is a combination of a subcomponent A 402 to a subcomponent C 404. Therefore, the subcomponent A 402 to the subcomponent C 404 are shown connected to the product 401 via edges in FIG. 4. In other words, the subcomponent A 402 to the subcomponent C 404 are constituent elements of the product 401. For example, when the product 401 is an automobile, an engine, a chassis, a body, and the like correspond to the constituent elements, that is, the subcomponents 402 to 404.

Further, the subcomponent A 402 to the subcomponent C 404 also include one or a plurality of parts such as a part A 405 and a part B 406. That is, it is indicated that the part A 405 and the part B 406 are constituent elements of the subcomponent A 402, apart C 407 and a part D 408 are constituent elements of the subcomponent B 403, and a part E 409 and a part F 410 are constituent elements of the subcomponent C 404. For example, when the subcomponent 402 is the engine of the automobile, a cylinder, a piston, and the like correspond to the constituent elements, that is, the parts 405, 406.

FIG. 5 is a diagram showing a data structure example of the BOM information storage unit. The BOM information storage unit 113 includes a correspondence table of a product 113A, a subcomponent A 113B, a subcomponent B 113C, a subcomponent C 113D, a part A 113E, a part B 113F, a part C 113G, a part D 113H, a part E 113J, and a part F 113K, and a bit of "1" is set in each corresponding point when there is a relation that defines constituent elements of each other. For example, since the product includes the subcomponent A 113B to the subcomponent C 113D, "1" is stored in a relevant area of a product row on the horizontal axis. Similarly, since the subcomponent A includes the part A 113E and the part B 113F, "1" is stored in a relevant area of the subcomponent A row on the horizontal axis.

FIG. 6 is a diagram showing a data structure example of the sensor arrangement information storage unit. The sensor arrangement information storage unit 114 includes sensor information names as row data, and includes a column of device type A 1141, a column of device type B 1142, and a column of device type C 1143 as column data. A plurality of devices of the same type are introduced in the manufacturing line, and the device type is information indicating the type of the device. Further, each sensor information name (cVar2 and the like) as the row data represents an individual item of the manufacturing data. In the row of cVar2, "1" is stored in the device type of the device from which the manufacturing data cVar2 are acquired. In this example, a value of the column of the device type A 1141 is "1", which indicates that the value of cVar2 is the data measured by a device having the device type A. The device type is associated in advance with a type that corresponds to a work content of a coating device, a stretching machine, and a heat treatment machine, for example.

FIG. 7 is a diagram showing a data structure example of the device type information storage unit. The device type information storage unit 115 includes a device ID 1151 and a device type 1152 which are associated with each other. That is, the device type information storage unit 115 stores information indicating which device type each device in the manufacturing line belongs to. For example, a device having a device ID "Eq1" is associated with "device type A" as a value of the device type 1152. This indicates that the device "Eq1" belongs to the device type A.

FIG. 8 is a diagram showing a data structure example of the construction starting history information storage unit. A construction starting history is information that indicates a correspondence (a result) between a product and a manufacturing device that processes the product. The construction starting history information storage unit 116 stores information that specifies a device in charge of each process for each product by using the product as the horizontal axis and the process as the vertical axis. For example, the product "A01" 1161 indicates that the processing is performed using a manufacturing device "Eq1" in process 1 (1166), a manufacturing device "Eq3" in process 2 (1167), and a manufacturing device "Eq6" in process 3 (1168). Similarly, information that specifies a device by which each process is performed is shown for other products. Even when a manual process is included, it is possible to cope with it by storing information that specifies a manual worker (or a team) in a similar manner to the manufacturing device.

The result value receiving unit 121 reads manufacturing log data including one or both of the manufacturing data obtained by monitoring the operating state of the manufacturing device and the inspection data. Specifically, the result value receiving unit 121 reads data from the manufacturing result storage unit 111 and the inspection result storage unit 112 of the storage unit 110.

The environment configuration information receiving unit 122 reads the BOM information, the sensor arrangement information, the device type information, and the construction starting history information. Specifically, the environment configuration information receiving unit 122 reads data from the BOM information storage unit 113, the sensor arrangement information storage unit 114, the device type information storage unit 115, and the construction starting history information storage unit 116 of the storage unit 110.

The expanded causal inference model construction unit 123 constructs an expanded causal inference model by using the manufacturing log data, the BOM information, the sensor arrangement information, the device type information, and the construction starting history information. Specifically, the expanded causal inference model construction unit 123 constructs a Bayesian network by associating correlated sensor items with causes and results using a structure learning algorithm such as a K2 algorithm regardless of whether the correlated items are strictly in a causal relation. Then, the expanded causal inference model construction unit 123 integrates the Bayesian network and constructs the expanded causal inference model by using information, that is, environment configuration information that specifies the environment configuration. The environment configuration includes a sensor facility, a process, a configuration of a product to be manufactured, and the like, which are included in the BOM information storage unit 113, the sensor arrangement information storage unit 114, the device type information storage unit 115, and the construction starting history information storage unit 116.

The expanded causal inference model saving unit 124 describes the Bayesian network constructed by the expanded causal inference model construction unit 123 with extended data of eXtensible Markup Language (XML) generally used, and saves the Bayesian network in the expanded causal inference model storage unit 117.

The model contraction unit 125 reduces a dimension of the expanded causal inference model by integrating and erasing data other than necessary data from the expanded causal inference model. That is, the contraction is performed by refining to necessary causal relations and extracting necessary information from the expanded causal inference model including causal relations of various data.

The contracted model reading unit 126 reads a model contracted by the model contraction unit 125 and delivers the model to the multi-application software generating unit 127.

The multi-application software generating unit 127 reads the contracted model, and generates application software that uses a screen transition and a processing content in accordance with a prescribed definition (definition described with XML). According to a configuration described with XML, the multi-application software generating unit 127 reads necessary information from the Bayesian network which is a contracted model, generates information necessary for display by performing prescribed calculation, and generates a screen to be displayed in accordance with screen information for defined transitionable display.

FIG. 9 is a diagram showing a hardware configuration example of the knowledge management device. The knowledge management device 100 can be implemented by a computer including a central processing unit (CPU) 101, a memory 102, an external storage device 103 such as a hard disk drive (HDD), an input device 104 such as a keyboard, a mouse, and a barcode reader, and an output device 105 such as a display, or a computer system including a plurality of computers.

For example, the result value receiving unit 121, the environment configuration information receiving unit 122, the expanded causal inference model construction unit 123, the expanded causal inference model saving unit 124, the model contraction unit 125, the contracted model reading unit 126, and the multi-application software generating unit 127 of the control unit 120 can be implemented by loading a prescribed program stored in the external storage device 103 into the memory 102 and executing the program by the CPU 101. The storage unit 110 can be implemented by utilizing the memory 102 or the external storage device 103 by the CPU 101.

However, the invention is not limited thereto, and the knowledge management device 100 can also be implemented by an application specific integrated circuit (ASIC) or a microcomputer, for example.

FIG. 10 is a diagram showing examples of a causal inference model and a probability structural equation. When the expanded causal inference model (the Bayesian network) is drawn as graphical data, a directed model having edges and nodes as shown in FIG. 10 is obtained.

The causal inference model refers to a graphical model which shows a relation between the cause and the result using a vertex, that is the node, and an arrow, that is the edge. In addition, the causal inference model includes a decomposition equation of a probability distribution corresponding to a graphical model including the nodes and edges as shown in FIG. 10.

In the example of the probability structural equation in FIG. 10, an example of a causal relation including a variable x1 (501), a variable x2 (502), a variable x3 (503), and a variable x4 (504) and a decomposition equation of the probability distribution are shown. This corresponds to a fact that the left side of the decomposition equation of the probability distribution, that is, the decomposed side expression is a joint probability distribution $p(x1, x2, x3, x4)$ of the variable x1 (501), the variable x2 (502), the variable x3 (503), and the variable x4 (504). Further, the right side is an expression obtained by decomposing the joint probability distribution into a product of conditional probabilities.

The conditional probability is expressed in a form of P(x|y) and shows a probability of x under a condition where a value of y is determined. In the causal inference model, the condition y represents the cause, and x represents the result. Accordingly, since a state where the probability distribution of x changes according to the value of y which is on the cause side can be expressed by a mathematical equation, the equation expresses a causal relation that the value of x changes according to the change in the value of the cause y. Further, the arrow, that is, the edge extends from the variable x1 (501) to the variable x2 (502) in FIG. 10. This corresponds to a fact that a conditional probability p(x2|x1) is included at the right side of the decomposition equation of the probability distribution. In the following examples, the conditional probability is also included at the right side of the decomposition equation in a form corresponding to the arrow.

There is no arrow, that is, no edge toward the variable x1 (501) in the causal inference model in FIG. 10. Therefore, the right side of the probability structural equation in FIG. 10 includes the probability p(x1) as a constant which is not in the form of the conditional probability. In addition, there are two arrows toward the variable x4 (504) from x2 (502) and x3 (503) in the causal inference model in FIG. 10. Correspondingly, the right side of the probabilistic structural equation in FIG. 10 includes p(x4|x2, x3) having both x2 and x3 as conditions. Similarly, the right side includes conditional probabilities in the form corresponding to each vertex.

FIG. 11 is a diagram showing examples of a save format of the causal inference model. In FIG. 11, a row direction indicates a root of the arrow of the causal relation, that is, a cause item, and a column direction indicates a tip end of the causal relation, that is, a result item. For example, in a row 1105 of "x1", a column 1102 of "x2" has a value of "1". This corresponds to a fact that there is an edge from x1 (501) toward x2 (502) in FIG. 10 (there is a causal relation). Meanwhile, in the row 1105 of "x1", a column 1104 of "x4" has a value of "0". This corresponds to a fact that there is no edge between x1 (501) and x4 (504) in FIG. 10 (although there is an indirect causal relation, there is no direct causal relation).

FIG. 12 is a diagram showing examples of a save format of the conditional probability p(x2|x1). For the sake of simplicity, in this example, x1 and x2 are variables that take any one of values 1, 2, 3, 4, and 5. In this example, a value of the probability in a column 1201 of "x2=1" and a row 1206 of "x1=1" is "0.32". This indicates that p(x1=1|x2=1)=0.32.

FIG. 13 is a diagram showing examples of a save format of the conditional probability p(x4|x2, x3). For the sake of simplicity, in this example, x2 and x4 are variables that take any one of values 1, 2, 3, 4, and 5, and x3 is a variable that takes any one of values 1, 2, and 3. In this example, a value of the probability in a column 1301 of "x4=1" and a row 1306 of "x2=1, x3=1" is "0.11". This indicates that p(x4=1|x2=1, x3=1)=0.11.

FIG. 14 is a diagram showing an example of a flow of a causal analysis processing. The causal analysis processing is started by receiving an instruction from an operator after turning on a power supply of the knowledge management device 100.

First, the result value receiving unit 121 reads the manufacturing log data (step S101). Specifically, the result value receiving unit 121 reads the manufacturing log data including one or both of the manufacturing data obtained by monitoring the operating state of the manufacturing device and the inspection data. For example, the result value receiving unit 121 reads one or both of the manufacturing data and the inspection data that are stored in the manufacturing result storage unit 111 and the inspection result storage unit 112, respectively.

Then, the environment configuration information receiving unit 122 reads the BOM information (step S102). Specifically, the environment configuration information receiving unit 122 reads structure data of the product stored in the BOM information storage unit 113.

Then, the environment configuration information receiving unit 122 reads the sensor arrangement information (step S103). Specifically, the environment configuration information receiving unit 122 reads a relation between the item of sensor information stored in the sensor arrangement information storage unit 114 and the device type.

Then, the environment configuration information receiving unit 122 reads the device type information (step S104). Specifically, the environment configuration information receiving unit 122 reads a relation between the sensor ID and the device type stored in the device type information storage unit 115.

Then, the environment configuration information receiving unit 122 reads the construction starting history information (step S105). Specifically, the environment configuration information receiving unit 122 reads the product ID and the history of the processing device for each process stored in the construction starting history information storage unit 116.

Then, the expanded causal inference model construction unit 123 constructs a causal inference model (step S106). Specifically, the expanded causal inference model construction unit 123 infers the causal relation by using the manufacturing log data, the BOM information, the sensor arrangement information, the device type information, and the construction starting history information, and constructs the causal relation model. Details of this processing will be described later.

Then, the model contraction unit 125 reads the target data of interest (step S107). Specifically, the model contraction unit 125 acquires data items necessary for a process which is desired to be improved on a pre-registered manufacturing line. For example, when it is desired to perform the machine difference analysis, a construction starting history that is read in the construction starting history information reading step (step S105) and data that includes product inspection data, particularly failure mode data are pre-registered as necessary data items. The product inspection data is obtained by inspecting the performance of the completed product acquired in the manufacturing log data reading step (step S101). The failure mode data is obtained by classifying determination results of non-defective/defective of products and defective types when the products are determined to be defective. Therefore, when the machine difference analysis is to be target software, the model contraction unit 125 reads the product inspection data and the construction starting history as the target data of interest.

Then, the model contraction unit 125 contracts the causal inference model for the target data of interest (step S108). Specifically, the model contraction unit 125 erases data other than the target data of interest (necessary data) by integration in the expanded causal inference model and performs a processing for reducing the dimension of the expanded causal inference model. The following Equation (1) to Equation (3) show an example of the integral processing for reducing the dimension.

[Equation 1]

$$p(y) = \int p(y, x_1, x_2, \ldots, x_m) dy dx_1 dx_2 \ldots dx_m \quad (1)$$

[Equation 2]

$$p(y, x_1) = \int p(y, x_1, x_2, \ldots, x_m) dy dx_2 \ldots dx_m \quad (2)$$

[Equation 3]

$$p(y \mid x_1) = \frac{p(y, x_1)}{p(y)} \quad (3)$$

The Equation (1) is an example of reducing the dimension of the causal inference model shown on the right side. In the Equation (1), y represents the product inspection data obtained by inspecting the performance of the completed product acquired in the manufacturing log data reading step (step S101) in FIG. 14. In the Equation (1), the dimension is reduced to the probability distribution of y by performing integral calculation on variables ($x_1$ to $x_m$) other than y.

Further, the Equation (2) is also an example of reducing the dimension of the causal inference model shown on the right side. In the Equation (2), y represents the product inspection data obtained by inspecting the performance of the completed product acquired in the manufacturing log data reading step (step S101) in FIG. 14, and $x_1$ represents the construction starting history read in the construction starting history information reading step (step S105). In the Equation (2), the dimension is reduced to the probability distribution of y and $x_1$ by performing integral calculation on variables ($x_2$ to $x_m$) other than y and $x_1$.

Further, the Equation (3) is an example of calculating the conditional probability by using the Equation (1) and the Equation (2). The left side is the conditional probability of y conditioned by $x_1$. The right side is obtained by dividing the left side of the Equation (2) by the left side of the Equation (1). It is possible to contract the causal inference model to a probability model relating to the target data of interest by integrating the expanded causal inference model in this manner. Further, for the conditional probability distribution, the probability model can be acquired by combining (dividing) the contracted models as in the Equation (3).

The above is a flow of the causal analysis processing. According to the causal analysis processing, the expanded causal inference model can be constructed by receiving the result value, and the probability model necessary for the target application software to be generated can be contracted and acquired.

FIG. 15 is a diagram showing an example of a flow of a causal inference model construction processing. The causal inference model construction processing is started at a causal analysis processing step S106.

First, the expanded causal inference model construction unit 123 infers a manufacturing log data model (step S1061). Specifically, the expanded causal inference model construction unit 123 infers a causal relation between the manufacturing data and the product inspection data. In this step, the expanded causal inference model construction unit 123 constructs a causal inference model for each of the lowermost constituent elements (terminals) among the BOM information read in step S102.

FIG. 16 is a diagram showing an example of a causal inference model of a terminal part. A causal inference model 1601 of a part A shows a causal inference model corresponding to the part A 405 shown in FIG. 4. As shown in FIG. 4, the part A is located at the most terminal of the tree structure of the BOM.

As shown in FIG. 16, a node 1602 closest to a result of the part A in the causal inference model 1601 shows intermediate inspection data that relates to the quality of the part A. The intermediate inspection data are obtained by inspecting the product performance in the intermediate state of the product being manufactured. Since the part A is a part configuring the product, the part A is inspected as a part separately from the final product performance.

Similarly, the expanded causal inference model construction unit 123 also constructs a causal inference model 1603 of a part B and a causal inference model 1605 of a part C. As described above, the causal inference model includes the graphical structure and the probability structure. Means that estimates the graphical structure in such causal inference is an algorithm such as a K2 algorithm, and the expanded causal inference model construction unit 123 adopts, for example, the K2 algorithm. Further, means that estimates the probability structure is a maximum likelihood estimation algorithm and the like, and the expanded causal inference model construction unit 123 adopts, for example, the maximum likelihood estimation algorithm.

Next, the expanded causal inference model construction unit 123 constructs a sensor data-device ID relation model (step S1062). Specifically, the expanded causal inference model construction unit 123 estimates the probability distribution of the sensor data conditioned by the device ID. For example, the estimated probability distribution is a probability distribution represented by p(cVar2|Eq=Eq1) and the like. Here, cVar2 is cVar2 (112b) in the inspection result storage unit 112 shown in FIG. 3, and Eq1 corresponds to "Eq1" which is the device ID 1151 in the device type information storage unit 115 shown in FIG. 7. That is, p(cVar2|Eq=Eq1) indicates the probability distribution of the variable cVar2 observed in the device "Eq1". The method of estimating p(cVar2|Eq=Eq1) is described as follows.

First, the expanded causal inference model construction unit 123 refers to the sensor arrangement information storage unit 114 shown in FIG. 6 and specifies the device type (device type A, and the like) in which the variable (cVar2) is observed. Next, the expanded causal inference model construction unit 123 refers to the device type information storage unit 115 shown in FIG. 7 and specifies the devices (Eq1 and Eq2) corresponding to the device type (device type A).

Further, the expanded causal inference model construction unit 123 refers to the construction starting history information storage unit 116 shown in FIG. 8, and specifies the product ID (A01, A03 and A05) manufactured by the device (Eq1). Then, the expanded causal inference model construction unit 123 refers to the inspection result storage unit 112 shown in FIG. 3 and estimates the probability distribution of cVar2 by restricting the data to a row where the product ID cVar1 (112a) is the product ID (A01, A03 and A05). That is, this is p(cVar2|Eq=Eq1).

The probability distribution of the sensor data that is conditioned by the device ID and estimated in the sensor data-device ID relation model construction step (step S1062) is represented as a graphical structure shown in FIG. 17.

FIG. 17 is a diagram showing a causal inference model of the sensor data conditioned by the device ID. In the causal inference model of FIG. 17, cVar2 (1701) corresponds to the variable cVar2. Eq (1702) represents a variable which takes any one of the devices Eq1 and Eq2 as a value. A calculation example of p(cVar2|Eq=Eq1) corresponds to an example when the Eq (1702) is the value of "Eq1".

Next, the expanded causal inference model construction unit 123 constructs a device ID-device type model (step S1063). Specifically, the expanded causal inference model construction unit 123 estimates the probability distribution between the device ID and the device type. An example of the estimated probability distribution is shown in the following Equation (4).

[Equation 4]

$$p(E_q = E_{q1} | \text{DEVICE TYPE} = \text{DEVICE TYPE A}) \quad (4)$$

The Equation (4) indicates the probability that the device whose device ID is "Eq1" belongs to the device type A. The probability value is calculated by the expanded causal inference model construction unit 123 using the device type information storage unit 115 shown in FIG. 7. In this example, since the value of the device type column in the row of "Eq1" is the device type A, the value of the probability of the Equation (4) is "1". Provisionally, when the value of the device type column in the row of "Eq1" includes a value other than the device type A, the value of the probability indicated by the Equation (4) is "0".

The probability distribution between the device type and the device ID which is estimated in the device ID-device type model construction step (step S1062) is represented as a graphical structure shown in FIG. 18.

FIG. 18 is a diagram showing a causal inference model of the device ID conditioned by the device type. In FIG. 18, Eq (1801) represents a variable that takes the device ID as a value, and the device type (1802) represents a variable that takes the device type as a value. That is, an example of the Equation (4) corresponds to an example when the Eq (1801) is "Eq1" and the device type (1802) is "device type A".

Then, the expanded causal inference model construction unit 123 constructs a component model (step S1064). Specifically, the expanded causal inference model construction unit 123 performs the causal inference between the product inspection data of each component. This example is shown in FIG. 19.

FIG. 19 is a diagram showing an example of a causal inference model of the inspection data. A leftmost node (1901) shows the product inspection data acquired in the manufacturing log data reading step S101. Meanwhile, nodes 1902 to 1904 on the right side show data obtained by inspecting the product performance in the intermediate state of the product being manufactured the in manufacturing log data reading step S101. These nodes correspond to a leftmost node 1602, a leftmost node 1604, and a leftmost node 1606 in the example of the causal inference model of the terminal part in FIG. 16, respectively.

A method of constructing the component model can be performed by using the same algorithm as used in the manufacturing log data model inference (step S1061).

Then, the expanded causal inference model construction unit 123 constructs an expanded causal inference model (step S1065). Specifically, the expanded causal inference model construction unit 123 integrates (multiplies all) the probability distributions constructed in the processing from the manufacturing log data model inference (step S1061) to the component model construction (step S1064) to construct the expanded causal inference model.

FIG. 20 is a diagram showing an example of the expanded causal inference model. FIG. 20 shows an example of an expanded causal inference model 2000 obtained by integrating a causal inference model 2001 of the part A, a causal inference model 2003 of the part B, and a causal inference model 2005 of the part C. The portion where a node 2007 and nodes (2002, 2004 and 2006) of each part are connected corresponds to the causal inference model constructed in the component model construction step S1064.

Further, the portion where a node 2008 and nodes (2010, 2011) are connected corresponds to the causal inference model constructed in the sensor data-device ID relation model construction step (1062). That is, a node 2009 corresponds to the device type, and the node 2008 corresponds to the device ID. The nodes 2010 and 2011 correspond to the acquired values of the sensors. Accordingly, when the causal relation of the BOM structure is expanded and the causal relation of the various result values is associated with each other, the expanded causality inference model is obtained. That is, the probability distribution of the manufacturing log data for each manufacturing device is included in the expanded causal inference model in a product form, and at the same time, the probability distribution of the manufacturing log data for each manufacturing device and each type of the manufacturing device is included in the expanded causal inference model in a product form.

The above is a flow of the causal inference model construction processing. According to the causal inference model construction processing, the expanded causal inference model can be constructed by integrating various result values.

FIG. 21 is a diagram showing an example of a causal inference model construction screen. A causal inference model construction screen 2100 includes a graphical model display unit 2101, a variable selection area 2102, a Build button 2103, and an Integral button 2104.

A graphical structure of the constructed causal inference model is output to the graphical model display unit 2101. Therefore, the constructed model can be confirmed visually.

The variable selection area 2102 receives setting input of the data of interest. Specifically, in the variable selection area 2102, a Tgt column and a Cond column are provided for each variable, and input of which variable is Tgt (acquisition probability) or which variable is Cond (condition designation) is received. For example, when the cVar2 variable is set to Tgt and the cVar5 variable is set to Cond, it is designated to obtain a probability model that is contracted to the probability of cVar2 in a condition designation cVar5. The input received in the variable selection area 2102 is read in the target data of interest reading step S107 and is used in the contraction processing in step S108.

When receiving the input, the Build button 2103 starts the processing from step S101 (manufacturing log data reading) to step S106 (causal inference model constructing) of the causal analysis processing. Then, the constructed expanded causal inference model is displayed on the graphical model display unit 2101.

When receiving the input, the Integral button 2104 reads the input of the variable selection area 2102 and starts the processing from step S107 (target data of interest reading) to step S108 (causal inference model contraction) of the causal analysis processing. Then, the contracted causal inference model (the probability model) is displayed on the graphical model display unit 2101.

(Example of Application to Mechanical Difference Analysis)

An example of a case of applying the model to a machine difference analysis application will be described using the expanded causal inference model and the contraction mechanism thereof. In the machine difference analysis application, the contracted model reading unit 126 reads the probability model that is contracted to a prescribed variable by the model contraction unit 125, and the multi-application software generating unit 127 automatically generates a screen and an operation widget in accordance with a prescribed eXtensible Markup Language (XML) definition. The mechanism may use a known application automatic generation technique.

FIG. 22 is a diagram showing an example of a failure mode selection screen of the machine difference analysis application. In a failure mode selection screen 2200, an occurrence ratio of a failure mode of a product failure is shown in a pie chart 2201. Information about the pie chart 2201 necessary for outputting of the screen corresponds to the occurrence ratio of each failure mode and the occurrence ratio is calculated by using the probability distribution shown in the Equation (1).

The failure mode selection screen 2200 includes the pie chart 2201, a failure mode selection input receiving area 2202, a "previous" button 2203, and a "next" button 2204.

The failure mode selection input receiving area 2202 is mounted by a check box and the like, and receives a plurality of selections of failure modes to be analyzed.

When receiving the input, the "previous" button 2203 makes a transition to a screen that is displayed before displaying the failure mode selection screen 2200. Normally, a login screen, another application, or a menu screen is assumed as a transition destination screen.

When receiving the input, the "next" button 2204 reads the failure mode received in the failure mode selection input receiving area 2202 as a parameter and makes a transition to the next screen.

FIG. 23 is a diagram showing an example of a box-whisker plot display screen for each process. A box-whisker plot display screen 2300 for each process is a screen to be transitioned to when the "next" button 2204 is pressed in a state where a failure mode A is selected in the failure mode selection input receiving area 2202 of the failure mode selection screen 2200.

As shown in FIG. 23, the box-whisker plot display screen 2300 includes a box-whisker plot display unit 2301, a process display unit 2302, a "previous process" button 2303, a "previous" button 2304, a "next" button 2305, a "next process" button 2306.

The box-whisker plot display unit 2301 plots the occurrence ratio of the selected failure mode A on the vertical axis, and the device on the horizontal axis. A graph displayed on the box-whisker plot display unit 2301 is a graph called a box-whisker plot, and is a graph in which a triangle representing the average value is superimposed on the box that describes the probability distribution by using a statistical summary amount of maximum, a third quartile, a median, a first quartile, and a minimum.

An upper end of the whisker given to each box represents the maximum, an upper end of the box represents the third quartile, the middle line in the box represents the median, a lower end of the box represents the third quartile, and a lower end of the whisker represents the minimum. When the "next" button 2204 of the failure mode selection screen 2200 is pressed, the box-whisker plot display unit 2301 is calculated by using the probability distribution which is derived from the contracted model of the Equation (3) by software realizing the machine difference analysis application. The Equation (3) is the conditional probability that the inspection result of each device is defective for each process and the defect of the inspection result is classified as A. In this graph, a process in which a position of the box-whisker plot is largely different from other processes is considered to be a process that affects the failure mode A.

The process display unit 2302 shows a process of the box-whisker plot shown in the current box-whisker plot display unit 2301. This example shows that the box-whisker plot is displayed in relation to process 3.

In this state, when there is an input to the "previous process" button 2303, the box-whisker plot displayed in the box-whisker plot display unit 2301 is changed to a box-whisker plot for process 2, which is then displayed, and when there is an input to the "next process" button 2306, the box-whisker plot displayed in the box-whisker plot display unit 2301 is changed to a box-whisker plot for process 4, which is then displayed.

When there is an input to the "previous" button 2304, a transition is made to a screen that is displayed before displaying the box-whisker plot display screen 2300 for each process. Normally, a failure mode selection screen 2200 is assumed as the transition destination screen.

When the "next" button 2305 receives an input, a transition is made to a box-whisker plot display screen that is the next screen for a plurality of processes.

FIG. 24 is a diagram showing an example of the box-whisker plot display screen for a plurality of processes. A box-whisker plot display screen 2400 for a plurality of processes is a screen on which a transition is made when the "next" button 2305 is pressed on the box-whisker plot display screen 2300 for each process.

As shown in FIG. 24, the box-whisker plot display screen 2400 for a plurality of processes includes a multi-device box-whisker plot display unit 2401, a process combination display unit 2402, a "previous process" button 2403, a "previous" button 2404, a "next" button 2405, and a "next process" button 2406.

The multi-device box-whisker plot display unit 2401 plots the occurrence ratio of the selected failure mode A on the vertical axis, and the combination of devices on the horizontal axis. The graph displayed on the multi-device box-whisker plot display unit 2401 is a box-whisker plot.

The multi-device box-whisker plot display unit 2401 is calculated by the probability distribution which is derived from the contracted model of the Equation (3) by software realizing the machine difference analysis. The Equation (3) is the conditional probability that the inspection result is defective for each combination of a plurality of processes and the defect of the inspection result is classified as A.

The process combination display unit 2402 shows a process of the box-whisker plot shown in the current multi-device box-whisker plot display unit 2401. This example shows that a box-whisker plot is displayed in relation to a combination of devices that are responsible for the process 1 and the process 2.

In this state, when there is an input to the "previous process" button 2403, the box-whisker plot displayed in the multi-device box-whisker plot display unit 2401 is changed to a box-whisker plot for the process 4, which is then displayed, and when there is an input to the "next process" button 2406, the box-whisker plot displayed in the multi-device box-whisker plot display unit 2401 is changed to a box-whisker plot for a combination of other processes, which is then displayed.

When there is an input to the "previous" button 2404, a transition is made to a screen that is displayed before displaying the box-whisker plot display screen 2400 for a plurality of processes. Normally, a box-whisker plot display screen 2300 is assumed as the transition destination screen.

When the "next" button 2405 receives an input, a transition is made to a box-whisker display screen that is the next screen (not shown) for three processes.

Machine difference analysis application software can be automatically generated by using such a screen as a contracted model, which is obtained by integrating variables other than target variables based on the expanded causal inference model.

Failure rate prediction, failure analysis, abnormality detection, and the like are assumed as other examples of deployment of application software generation using the causal inference model with a reduced dimension constructed in the causal inference model contraction processing (step S108).

When generating failure rate prediction application software, an inspection result for the completed product can be predicted by using manufacturing data by taking the product inspection data obtained by inspecting the performance of the completed product in y and the manufacturing data obtained by monitoring the state of the device of the manufacturing device such as temperature and pressure during operation in x as p(y|x). When it is defined to use the data obtained by contracting the expanded causal inference model to p(y|x) in the XML definition, the failure rate prediction application software can be automatically generated.

Further, even in generating failure analysis application software, it is possible to specify the device data which causes the failure by constructing the contracted model similar to the case of the failure prediction.

Further, when the abnormality detection is performed, the probability distribution of the manufacturing data at the normal time can be specified by taking the manufacturing data obtained by monitoring the state of the device of the manufacturing device such as temperature and pressure during the operation in x as p(x), and when the manufacturing data takes a value deviating from the probability distribution, it can be detected as an abnormality. When a threshold is also defined by using the data obtained by contracting the expanded causal inference model to p(x) in the XML definition, abnormality detection application software can be automatically generated.

The above is an embodiment according to the invention. According to the above embodiment, various types of application software can be automatically generated at the manufacturing site according to the diagnosis result.

The invention is not limited to the above embodiment, and includes various modifications. For example, the embodiment described above is detailed for easy understanding but the invention is not necessarily limited to include all the above configurations.

A part of the configuration of each embodiment may be combined with another configuration, omitted, or replaced with another configuration.

A part or an entirety of the above configurations, functions, processing units, and the like may be implemented by hardware, for example, by being designed as an integrated circuit. Further, each of the above configurations, functions, and the like may be implemented by software control that executes an operation according to a program implementing each function by a processor. Information about the programs, tables, files, and the like for implementing the functions can be stored in a recording device such as a memory, a hard disk and an SSD or a recording medium such as an IC card, an SD card and a DVD, can be read from a random access memory (RAM) at the time of being executed by a CPU and the like.

Only control lines and information lines that are considered necessary for description are illustrated, and not necessarily all the control lines and information lines required for production are illustrated. In practice, it may be considered that almost all the configurations are connected with each other.

A part or an entirety each of the above configurations, functions, processing units, and the like may be implemented by a distributed system, for example, by being executed by another device and being integrated via a network or the like.

Technical elements of the above embodiment may be applied alone, or may be divided into a plurality of portions such as program parts and hardware parts.

The invention has been described mainly through the embodiment.

REFERENCE SIGN LIST

100 ... knowledge management device, 110 ... storage unit, 111 ... manufacturing result storage unit, 112 ... inspection result storage unit, 113 ... BOM information storage unit, 114 ... sensor arrangement information storage unit, 115 ... device type information storage unit, 116 construction starting history information storage unit, 117 ... expanded causal inference model storage unit, 120 ... control unit, 121 ... result value receiving unit, 122 ... environment configuration information receiving unit, 123 ... expanded causal inference model contraction unit, 124 ... expanded causal inference model saving unit, 125 ... model contraction unit, 126 ... contracted model reading unit, 127 ... multi-application software generating unit.

The invention claimed is:

1. A software generation method for generating software by using a computer,
wherein the computer includes a control unit and a storage unit,
the storage unit stores manufacturing log data and environment configuration information that includes sensor data acquired in one or both of a manufacturing process and an inspection process, bill of materials (BOM) information that specifies a product configuration, device type information and construction starting history information, and
the control unit performs:
a result value receiving step of reading the manufacturing log data from the storage unit,
an environment configuration information reading step of reading the environment configuration information from the storage unit,
an expanded causal inference model construction step of constructing a causal inference model based on the manufacturing log data and constructing an expanded causal inference model by expanding the causal inference model by using the environment configuration information,
a model contraction step of generating a contracted model by contracting the expanded causal inference model to a causal relation of prescribed target data of interest, and
a software generation step of reading the contracted model and generating prescribed application software,
wherein the causal inference model is constructed for each component included in the BOM information and is integrated to the expanded causal inference model in the expanded causal inference model contraction step, wherein the expanded causal inference model includes a probability distribution of the manufacturing loci data in a product form for each manufacturing device and each type of the manufacturing device in the expanded causal inference model construction step, and wherein the storage unit stores the prescribed target data of interest for each application software, and the expanded causal inference model is contracted by being restricted and integrated to a causal relation of the target data of interest in the model contraction step.

2. The software generation method according to claim 1, wherein a Bayesian network is used in the expanded causal inference model construction step.

3. The software generation method according to claim 1, wherein the expanded causal inference model includes a probability distribution of the manufacturing log data in a product form for each manufacturing device in the expanded causal inference model construction step.

4. The software generation method according to claim 1, wherein the storage unit stores, as the target data of interest, a failure mode occurrence ratio and information specifying a process as a condition thereof in association with machine difference analysis application software, and the expanded causal inference model is contracted by being restricted and integrated to the failure mode occurrence ratio with the information that specifies the process as the condition in model contraction step.

5. A software generation system comprising:
a processor;
a control unit; and
a storage unit,
wherein the storage unit stores manufacturing log data and environment configuration information that includes sensor data acquired in one or both of a manufacturing process and an inspection process, bill of materials (BOM) information that specifies a product configuration, device type information and construction starting history information, and the control unit performs
a result value receiving step of reading the manufacturing log data from the storage unit,
an environment configuration information reading step of reading the environment configuration information from the storage unit,
an expanded causal inference model construction step of constructing a causal inference model based on the manufacturing log data and constructing an expanded causal inference model by expanding the causal inference model by using the environment configuration information,
a model contraction step of generating a contracted model by contracting the expanded causal inference model to a causal relation of prescribed target data of interest, and
a software generation step of reading the contracted model and generating prescribed application software, wherein the causal inference model is constructed for each component included in the BOM information and is integrated to the expanded causal inference model in the expanded causal inference model contraction step, wherein the expanded causal inference model includes a probability distribution of the manufacturing loci data in a product form for each manufacturing device and each type of the manufacturing device in the expanded causal inference model construction step, and wherein the storage unit stores the prescribed target data of interest for each application software, and the expanded causal inference model is contracted by being restricted and integrated to a causal relation of the target data of interest in the model contraction step.

* * * * *